United States Patent
Kompella et al.

(10) Patent No.: US 8,040,901 B1
(45) Date of Patent: Oct. 18, 2011

(54) PACKET QUEUEING WITHIN RING NETWORKS

(75) Inventors: Kireeti Kompella, Los Altos Hills, CA (US); Pradeep Sindhu, Los Altos Hills, CA (US); Jean-Marc Frailong, Los Altos, CA (US); David J. Ofelt, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 314 days.

(21) Appl. No.: 12/360,609

(22) Filed: Jan. 27, 2009

Related U.S. Application Data

(60) Provisional application No. 61/026,611, filed on Feb. 6, 2008.

(51) Int. Cl.
*H04L 12/28* (2006.01)
(52) U.S. Cl. .................................. 370/395.71
(58) Field of Classification Search ............... 370/395.5, 370/395.7, 395.71
See application file for complete search history.

(56) References Cited

U.S. PATENT DOCUMENTS

| | | | | |
|---|---|---|---|---|
| 7,453,873 | B1 * | 11/2008 | Takefman et al. | 370/389 |
| 2004/0090974 | A1 * | 5/2004 | Balakrishnan et al. | 370/412 |
| 2004/0100984 | A1 * | 5/2004 | Nam et al. | 370/438 |
| 2005/0013251 | A1 * | 1/2005 | Wang et al. | 370/235 |
| 2005/0044272 | A1 * | 2/2005 | Uzun et al. | 709/245 |
| 2006/0002370 | A1 * | 1/2006 | Rabie et al. | 370/351 |
| 2006/0250986 | A1 * | 11/2006 | Alharbi et al. | 370/258 |
| 2006/0280122 | A1 * | 12/2006 | Honma et al. | 370/235 |

OTHER PUBLICATIONS

"Achieving 100% Throughput in an Input-Queued Switch, INFOCOM1996 of the IEEE Computer Societies" by Nick McKeown et al.*

* cited by examiner

*Primary Examiner* — Ayaz Sheikh
*Assistant Examiner* — Hai-Chang Hsiung
(74) *Attorney, Agent, or Firm* — Shumaker & Sieffert, P.A.

(57) ABSTRACT

In general, techniques are described for packet queuing within ring networks. In accordance with the techniques, a network device of a ring network comprises a memory having a different queue for each order-dependent pair of the network devices. Each pair represents a different order-dependent combination of the network devices that includes an ingress network device that provides an ingress to the ring network and an egress network device that provides an egress from the ring network. The network device further comprises an interface for receiving a packet from a neighboring one of the plurality of network devices and a control unit that, in response to receiving the packet, stores the packet to one of the queues based on which network devices is the ingress and which network device is the egress for the packet. The control unit forwards the stored packet via the ring network according to a scheduling algorithm.

58 Claims, 5 Drawing Sheets

PACKET QUEUEING WITHIN RING NETWORKS

This application claims the benefit of U.S. Provisional Application No. 61/026,611, filed Feb. 6, 2008, the entire content of which is incorporated herein by reference.

TECHNICAL FIELD

The invention relates to computer networks and, more particularly, to transmitting packets within computer networks.

BACKGROUND

A computer network is a collection of interconnected computing devices that can exchange data and share resources. Often, in highly populated areas, the computer network includes an optical fiber backbone to facilitate the transfer of large amounts of data between the computing devices. Optical fiber backbones are preferred because data can be exchanged over the optical fiber at higher speeds with reduced attenuation when compared to conventional wire or cable links. In some configurations, an optical fiber backbone may be laid in the shape of a ring because a ring offers generous geographical coverage and reasonable resiliency. When shaped in a ring, the optical fiber network is referred to as a "ring network."

Certain network devices, referred to as "switches," provide access to the ring network. Computing devices couple to the switches to gain access to the ring network and thereby interconnect with other computing devices coupled to the fiber ring network. One of the switches may provide access to a public network, such as the Internet, or another private network, and this device is typically referred to as a "hub." Via the hub, the computing devices may utilize the ring network to access the public or adjacent network.

While providing high transfer speeds, generous geographical coverage, and reasonable resilience, fiber ring networks often fail to treat data fairly as the data traverses around the ring, especially when the ring network comprises a packet-based ring that conveys information via packets instead of conventional multiplexed signals. In a packet-based ring network, each switch typically includes a single queue to store packets destined to traverse the ring. At a given switch, the queue, therefore, stores both packets originating from computing devices directly coupled to the switch as well as transit packets already traversing the ring without taking into consideration the position of each switch around the ring. Transit packets destined for a given hub but injected into the ring by switches distant from the hub are successively queued by each intermediary switch on the way to the destination hub, which may result in significant delays. As a result, those switches closer to the hub receive preferential access to the hub because packets injected by these switches experience fewer delays as the packet traverse fewer intermediary switches on the way to the hub. The successive delays may result in violation of agreed upon quality of service for end users of the ring.

Certain techniques, such as those employed by resilient packet rings (RPR), have been proposed as an attempt to correct this preferential treatment. In RPR, each switch includes a first queue to store packets entering the ring network at that switch and a second queue to store transit packets already present on or traversing the ring. The additional queue enables switches to execute more complicated packet scheduling algorithms to account for the preferential treatment to those packets entering the ring. Those packets already traversing the ring, however, still receive unfair treatment because, again, the switches do not take into consideration the position of each switch around the ring. As a result, delays occur even when implementing these proposed techniques, which, as above, often lead to violations of quality of service agreements with the end user.

SUMMARY

In general, techniques are described for fair packet queuing by network devices (e.g., L2 switches, L3 routers or combinations thereof) that forward packets within a packet-based ring network. As described herein, each network device maintains a queue for each possible order-dependent pair of the network devices within the ring network from which the network device may receive packets for forwarding on the ring network. Each network device may maintain a total of approximately $N^2$ queues, where N is the number of network devices residing within the ring network so as to form the ring topology. Thus, assuming no queues are separately allocated for multicast traffic, in a ring network comprising N network devices along the ring, each of the network devices maintains a set of queues that includes $N \times (N-1) \approx N^2$ distinct queues for forwarding traffic along the network ring. That is, each of the N network devices (including that same network device) may inject traffic to egress the ring at any of the other N−1 network devices, and a separate queue is maintained to store corresponding packets.

More specifically, a single order-dependent pair of queues for a ring network of N network devices requires two queues. For example, a node $N_x$ of the ring network uses a first queue to store packets that were injected on the ring by a network device $N_1$ and are destined to leave the ring at a network device $N_2$ and another queue of the order-dependent pair of queues to store traffic entering the ring network from $N_2$ and exiting the ring network at $N_1$ (queue $N_2$, $N_1$). Thus, each queue is "order-dependent" in that a separate queue exists for each variation of the order of the pair of referenced devices, e.g., $N_1$ and $N_2$, along the ring network. As described herein, each network device maintains order-dependent pairs of queues for each combination of network devices along the ring from which or to which the network device may receive or send packets. In this way, each network device of a ring network having N nodes may maintain on the order of $N^2$ queues for forwarding traffic along the ring, including queuing for traffic to ingress and egress the ring at that network device.

The preceding paragraph described queuing for "unicast" traffic that enters the ring at one device and egresses at one other device. In addition, network device may provide queues for multicast traffic that enters the ring at one device but egresses at several devices (perhaps all other devices, such as in broadcasting) on the ring. Thus, in addition to the N*(N−1) queues for unicast traffic, one node or network device may include another N queues for multicast traffic that enters the ring at each of N devices on the ring.

The techniques described herein may be applied so as to take into account quality of service (QoS) classes that define classes of traffic that require certain treatment with regard to resources within a network. To account for quality of service (QoS) classes, each network device along the ring may, instead of including a single queue for each order-dependent pair of network devices within the ring, include a separate queue for each QoS class for each order-dependent pair of network devices. As a result, each network device along the ring network may maintain a total of $N^2 \times M$ queues for forwarding traffic along the ring, where M is the number of QoS classes and N represents the number of network devices along the ring. Because a separate queue exists for each order-dependent pair (and separately for multicast traffic), the network devices (e.g., routers) may employ packet scheduling algorithms that enable fair treatment of downstream packets injected into the ring by switches remote from that particular network device. By further including a queue for each QoS class, the switches may further ensure that the best possible treatment be given to packets of QoS classes that promise high speeds/bandwidth, thereby reducing delays that may violate QoS agreements.

In an example embodiment, a network device of a plurality of network devices that form the ring network includes a forwarding component having one or more memories (e.g., in the form of addressable memory or dedicated, high-speed buffers) to store the plurality of packet queues. As described above, each of the queues may be used to store packets for a different order-dependent pair of the plurality of network devices. Alternatively, each of the queues may be used to store packets for different QoS classes for the different order-dependent pairs. Each pair of network devices can be logically defined as an entry network device at which a packet enters the ring network and an exit network device at which the packet exits the ring network. In some embodiments, queues for which the entry network device and the exit network device of the pair may be the same network device along the network ring, and the queue for this pair may be designated to store multicast packets forwarded by the entry network device, thereby facilitating the fair queuing of these multicast packets.

The network device further includes a plurality of interface cards for receiving packets originating from a neighboring network device along the ring as well as local computing devices that send or receive packets to or from the network ring. In general, each of the packets includes a source address and a destination address, and the destination address may be a unicast address or a multicast address. The forwarding component of the network device also includes a control unit that stores each of the packets to one of the plurality of queues based on the ingress network device that injected the packet in the ring and the egress network device that will remove the packet from the ring. In one example, the forwarding component is a layer 3 (L3) component that utilizes source and destination addresses (e.g., IP addresses) included within a header of each of the packets to make queuing decisions. For example, the network device may be a router that, based on the source and destination address, determines that the packet was injected into the ring from a network device $N_5$ and is will egress the ring at network device $N_7$. As a result, the control unit stores the packet to a corresponding queue dedicated to storing packets for this ordered-pair of devices (e.g., queue $N_5$, $N_7$). Similarly, for multicast traffic, the network device may determine that the packet entered the ring at device Ng and thus store it in multicast queue Ng. The control unit may make similar decisions for other packets traversing the ring network so as to store the packets in the appropriate queues. Other information may be used, such as MPLS tags or other identifiers, including a tag or identifier added by the ingress network device that injected the packet into the ring. In any event, once stored, the control unit of the network device applies a scheduling algorithm to forward via the ring network the packets stored within the queues such that each of the queues receives an appropriate allocation of available bandwidth at that network device. As one example, the control unit of the network device may apply the scheduling algorithm to traverse the queues and schedule for forwarding first those packets stored to queues associated with network devices along the network ring that are distant from the network device prior to scheduling those packets stored to queues associated with network devices proximate to the hub. In addition, the scheduling algorithm takes into account QoS classes for the traffic.

The techniques described herein may provide one or more advantages. As one example, the techniques may provide fine-grain control of scheduling traffic for forwarding on the ring network. As another example, the techniques may allow the network devices along the ring network to inform each other as to the capacity of each of the distinct queues within each of the network devices such that the network devices may adjust packet scheduling and forwarding to account for near-capacity queues by refraining from transmitting packets destined for those near-capacity queues. This aspect of the fair packet queuing techniques enables network devices not only to adjust forwarding to prevent packets from being dropped but also may replace 'hello' messages, "keep alives" or other control plane messages used to determine status of the network devices along the ring. This may be especially useful when these conventional control messages otherwise utilized within the ring are sent at frequent intervals, e.g., on the order of milliseconds.

In one embodiment, a method comprises determining a number of packet forwarding network devices that provide ingress to or egress from to a packet-based, ring network, and within a first one of the network devices, allocating a queue for each order-dependent pair of the network devices, wherein each of the pairs represents a different order-dependent combination of the network devices that includes one of the network devices that provides an ingress for packets to the ring network and one of the network devices that provides an egress from the ring network for the packets. The method further comprises receiving, with the first one of the network devices, a packet forwarded by a neighboring one of the other plurality of network devices along the ring network and selecting one of the order-dependent pairs of the network devices based on the one of the network devices that provided the ingress for the packet to the ring network and the one of the network devices that will provide the egress for the packet from the ring network. The method also comprises selecting one of the plurality of queues within the first one of the network devices based on the selected order-dependent pair of network devices, storing the packet to the selected queue within the first one of the network devices, and forwarding the packet via the ring network.

In another embodiment, a network device of a plurality of network devices that form a ring network, the network device comprises a memory having a different queue for each order-dependent pair of the network devices, wherein each of the pairs represents a different order-dependent combination of the network devices that includes one of the network devices that provides an ingress for packets to the ring network and one of the network devices that provides an egress from the ring network for the packets, and an interface for receiving a packet from a neighboring one of the plurality of network devices. The network device further comprises a control unit that, in response to receiving the packet, stores the packet to one of the queues based on the one of the network devices that provided the ingress for the packet to the ring network and the one of the network devices that will provide the egress for the packet from the ring network, the control unit forwarding the stored packet via the ring network according to a scheduling algorithm.

In another embodiment, a system that forms a ring network, the system comprising a plurality of network devices. Each of the network devices comprises a memory having a different queue for each order-dependent pair of the network devices, wherein each of the pairs represents a different order-dependent combination of the network devices that includes one of the network devices that provides an ingress for packets to the ring network and one of the network devices that provides an egress from the ring network for the packets and a further set of queues for multicast traffic, and an interface for receiving a packet from a neighboring one of the plurality of network devices. Each of the network devices further comprises a control unit that, in response to receiving the packet, stores the packet to one of the queues based on the one of the network devices that provided the ingress for the packet to the ring network and the one of the network devices that will provide the egress for the packet from the ring network, the control unit forwarding the stored packet via the ring network according to a scheduling algorithm.

In another embodiment, the invention is directed to a computer-readable medium containing instructions. The instructions cause a programmable processor to determine a number of packet forwarding network devices that provide ingress to or egress from to a packet-based, ring network, and within a first one of the network devices, allocate a queue for each order-dependent pair of the network devices, wherein each of the pairs represents a different order-dependent combination of the network devices that includes one of the network devices that provides an ingress for packets to the ring network and one of the network devices that provides an egress from the ring network for the packets. The instructions further cause the processor to receive, with the first one of the network devices, a packet forwarded by a neighboring one of the other plurality of network devices along the ring network and select one of the order-dependent pairs of the network devices based on the one of the network devices that provided the ingress for the packet to the ring network and the one of the network devices that will provide the egress for the packet from the ring network. The instructions also cause the processor to select one of the plurality of queues within the first one of the network devices based on the selected order-dependent pair of network devices, store the packet to the selected queue within the first one of the network devices, and forward the packet via the ring network.

In another embodiment, a method comprising determining a number of packet forwarding network devices that provide ingress to or egress from to a packet-based, ring network and within a first one of the network devices, allocating a queue for each order-dependent pair of the network devices, wherein each of the pairs represents a different order-dependent combination of the network devices that includes one of the network devices that provides an ingress for packets to the ring network and one of the network devices that provides an egress from the ring network for the packets.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
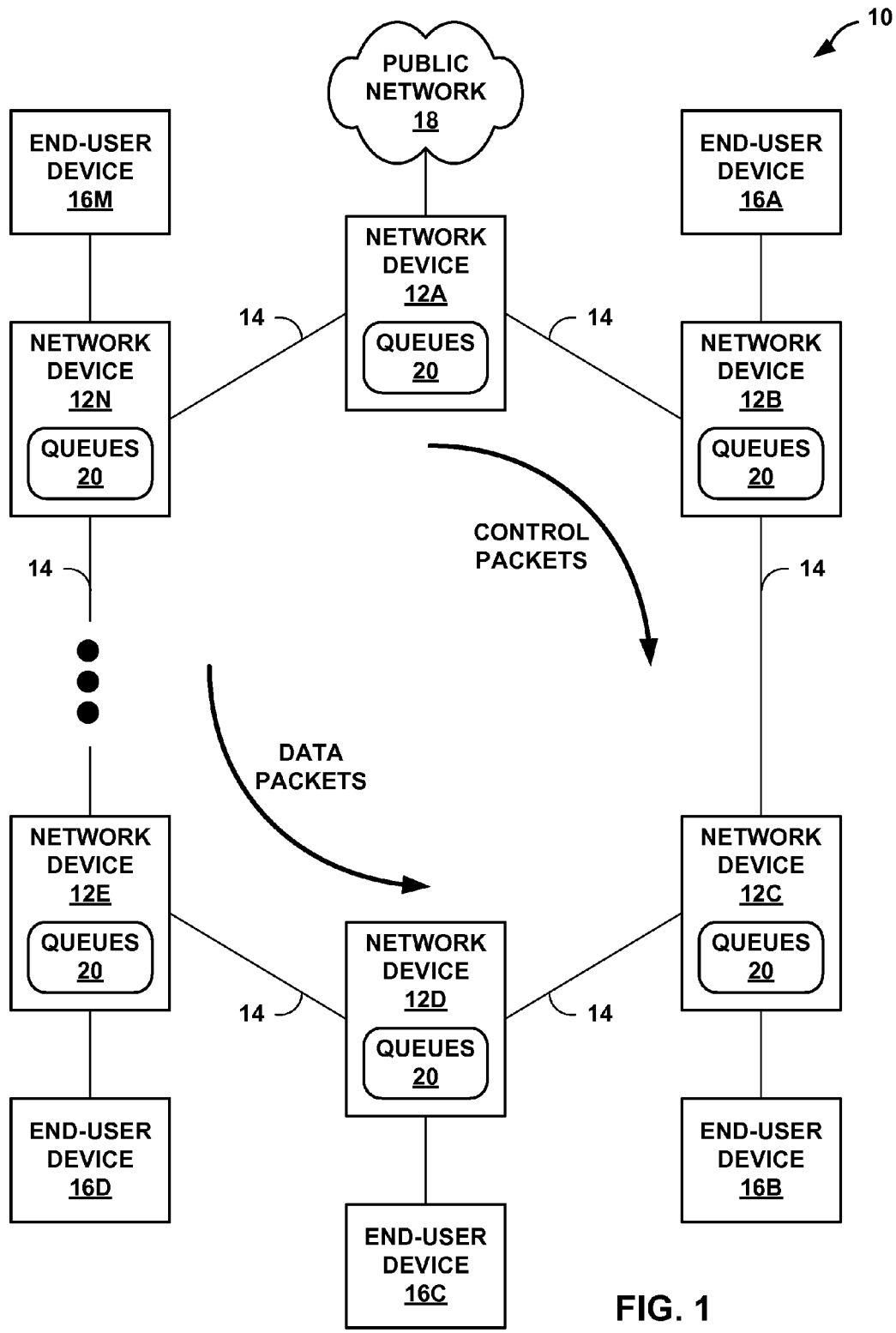
FIG. 1 is a block diagram illustrating an example ring network in which packet-forwarding network devices operate in accordance with the fair packet queuing techniques described herein.

FIG. 1 is a block diagram illustrating an example ring network 10 in which packet-forwarding network devices 12A-12N operate in accordance with the fair packet queuing techniques described herein. In this example, network devices 12A-12N ("network devices 12") are interconnected via optical fiber links 14 to form packet-based, optical fiber ring network 10. Network devices 12 may be routers, hubs, switches, and any other type of network device capable of performing the fair packet queuing techniques described herein. While described herein with respect to optical fiber links 14, the links may comprise any form of link, including radio frequency cable links, Ethernet cable links, or any other form of wired or even wireless communication mediums.

For example, network devices 12 may be layer three (L3) enabled devices, such as routers. Alternatively, network devices 12 may comprise layer two (L2), or data link layer, network devices, such as intelligent switches, hubs, or other L2 network devices. In some implementations, network devices 12 may implement both L2 forwarding and L3 routing functions. For purposes of illustration, network devices 12 may be referred to as switches or hubs herein.

As shown in FIG. 1, end-user devices 16A-16M ("end-user devices 16") couple to respective network devices 12B-12N. For ease of illustration, only one end-user device 16 is shown coupling to each of respective network devices 16B-16N. However, more than one device 16 (and typically a corresponding network of devices 16) may couple to each of network devices 12B-12N and the principles of the invention should not be strictly limited to the illustrated example. End-user devices 16 may each comprise one of a laptop computer, a desktop computer, a personal digital assistant (PDA), a workstation, a cellular phone, or any other device capable of accessing ring network 10 via common network protocols, e.g., TCP/IP.

Often in ring networks, one or more of network devices 12 may be viewed as a hub where two or more separate networks interconnect. In the example of FIG. 1, network device 12A is a hub in that network device 12A interconnects ring network 10 with a public network 18. Public network 18 may comprise a network available for access by the public, such as the Internet. Network device 12A may forward network traffic from public network 18 to network devices 12 within ring network 10, i.e., provide an ingress for the network traffic to ring network 12. Although shown as coupling to public network 18, network device 12A may interconnect with any type of network, both private and public, as well as with other ring networks. Moreover, although not shown in FIG. 1, multiple hubs may reside within ring network 10.

Network devices 12 are interspersed around ring network 10 so as to provide end-user devices 16 located in disparate geographical locations with access to high-speed ring network 10, and thereby to public network 18. Moreover, in this example, each of network devices 12 provides an ingress to ring network 10 and an egress from ring network 10. By forming a ring, ring network 10 offers resiliency because data may flow in two directions around the ring. That is, should one of links 14 fail or otherwise stop transmitting packets, network devices 12 adjacent to the failed link 14 may each forward packets away from the failed link 14 around ring network 10 to reach the desired destination. For example, if link 14 between network devices 12A and 12B fails, network device 12A can forward packets destined for network device 12B counter-clockwise around ring network 10 to reach network device 12B. Similarly, network device 12B can forward packets destined for network device 12A clockwise around ring network 10 to reach network device 12A. Thus, ring network 10 offers increased resiliency by providing access to each of network devices 12 in two directions, i.e., clockwise and counter-clockwise. In contrast, conventional meshed networks may be required to interconnect a pair of switches via two fiber links 14 in order to provide the same resiliency, which increases costs when compared to ring networks.

In order to detect a failed link 14, network devices 12 may transmit control packets, often referred to as "hello messages," in one direction around the ring, and may transmit data packets in the opposite direction around the ring. As shown in FIG. 1, network devices 12 forward control packets around ring network 10 in a clockwise direction and data packets in a counter-clockwise direction. This forwarding structure is merely representative of one embodiment, and in alternative embodiments, network devices 12 may perform more complex forwarding to reduce the number of intermediary network devices 12 between, for example, network device 12E and network device 12A. For example, assuming only six network devices 12 are interspersed around ring network 10, network device 12E may forward data packets clockwise to reach network device 12A instead of counter-clockwise because clockwise forwarding requires the traversal of only one intermediary network devices 12N, while counter-clockwise requires the traversal of three intermediary network devices 12D, 12C, and 12B. Again, the embodiment depicted in FIG. 1 is merely for purposes of illustration and the principles of the invention should not be strictly limited to the simple forwarding structure illustrated therein.

Network devices 12 may periodically forward control messages to adjacent network devices along the ring and maintain a maximum time interval (e.g., threshold) by which to determine whether one of links 14 has failed. For example, network device 12B may send a control message to network device 12A. If network device 12B does not receive a response control message from network device 12A within the maximum time interval, network device 12B determines that link 14 coupling network device 12A to network device 12B has failed. Upon determining a failed link 14, network device 12B may send a control message, or failed link message, clockwise around ring network 10 to alert each of network devices 12 that the link 14 between network device 12A and 12B has failed. Network devices 12 may receive the control message and modify the forwarding of data packets around ring network 10 to account for failed link 14. For example, each of network devices 12 may update stored forwarding information to reflect the change in topology of network 10. In this manner, network devices 12 may detect a failed link 14 and modify the manner in which packets are forwarded within ring network 10 to account for the failed link 14.

In the example of FIG. 1, each of network devices 12 maintains a plurality of queues 20. Each queue within the plurality of queues 20 stores packets associated with a different order-dependent pair of the plurality of network devices 12. Thus, each of N network devices 12 along the network device maintains separate queues dedicated to queuing traffic for each possible order-dependent pair for the other N−1 devices, where an order-dependent pair of network devices represents the network device that injected the queued packets into the ring and the network device that will provide the egress for the queued packets. Additionally, each of the N network devices 12 may maintain N queues dedicated to queuing multicast traffic ingressing the ring at each of N network devices.

Although not shown in FIG. 1, other packet-forwarding network devices may be deployed along ring network 10 to forward or relay packets without providing either an ingress or egress for the network ring. In such cases, these packet-forwarding network devices may employ the queuing techniques described herein. Moreover, such devices need not necessarily be accounted for when determining the number of queues based on the various combinations of ordered-pairs of network devices as such devices neither ingress packets to or egress packets from ring network 10.

In some cases, as explained below, for multicast packets, this may also include an order-dependent pair for which the originating device is equivalent to the destination device. Thus, any given intermediate network device 12 (e.g., network device 12C) may maintain one queue to store packets injected into the ring network by network device 12A to be egressed at network device 12B, and a second queue to store packets ingressed at network device 12C and to be egressed from the ring at network device 12A. Thus, each queue is "order-dependent" in that a separate queue exists for each variation of the order of the pair of referenced devices, e.g., network devices 12A, 12C. Thus, in a ring network comprising N network devices 12 along the ring, each of the network devices 12 maintains a set of queues 20 that includes N×(N−1)≈$N^2$ distinct queues for forwarding traffic along the network ring. That is, assuming no queues are separately allocated for multicast traffic, each of the N network devices 12 (including that same network device) may inject traffic to egress the ring at any of the other N−1 network devices. Assuming for exemplary purposes that ring network 10 of FIG. 1 includes fourteen network devices 12, each of network devices 12 configures a total of N*N−1 (or approximately $14^2$) or 196 queues, an abbreviated listing of which proceeds below in Table 1, ingress device refers to the node that injected the packet into the ring (possibly after receiving the packet from a source end-user device) and egress device refers to the network device that will remove the packet from the ring network (and possibly forward the packet to a destination end-user device):

TABLE 1

| Queue No. | Ingress Device | Egress Device |
|---|---|---|
| 0 | 12A | 12A |
| 1 | 12A | 12B |
| 2 | 12A | 12C |
| ... | | |
| 193 | 12N | 12L |
| 194 | 12N | 12M |
| 195 | 12N | 12N |

As shown in the above Table 1, queues 20 may include queues for storing packets where the ingress network device and egress network device reference the same device. By convention, these queues 20 may be designated to store both broadcast packets, e.g., packet to be sent to all nodes of the ring except for the ingress node, and multicast packets, e.g., packets to be sent in a point-to-multipoint (P2MP) fashion to members of a multicast group, wherein the originating/destination device may identify a multicast group associated with the packets. In one embodiment, a queue used to store multicast packets ingressing the ring at a network device using an order-dependent pair in which the originating device is the same as the destination device. See, for example, queues 0 and 195 above. In some embodiments, at any of network devices 12, only one of the plurality of queues 20 need be used to store all multicast packets ingressing anywhere on the network ring, and network devices 12 may only define one such queue 20 with the understanding that all multicast packets be stored to this one of queues 20. Alternatively, in networks 10 not requiring multicast packets, network devices 12 may eliminate these queues 20 thereby decreasing the total number of queues from $N^2$ to $(N)\times(N-1)$ queues or approximately $N^2$, where N equals the number of network devices 12 interspersed around ring network 10.

In some embodiments, network devices 12 may, instead of just configuring a single queue for each order-dependent pair of network devices along the network ring, configure a queue for each QoS class for each order-dependent pair for a total of approximately $N^2 \times M$, where M equals the number of QoS classes. The following table 2 presents an abbreviated listing of these queues assuming N=14 and:

TABLE 2

| Queue No. | Originating Device | Destination Device | QoS Class |
|---|---|---|---|
| 0 | 12A | 12A | Voice |
| 1 | 12A | 12A | Business |
| 2 | 12A | 12A | Best Effort |
| 3 | 12A | 12B | Voice |
| 4 | 12A | 12B | Business |
| 5 | 12A | 12B | Best Effort |
| ... | | | |
| 584 | 12N | 12M | Best Effort |
| 585 | 12N | 12N | Voice |
| 586 | 12N | 12N | Business |
| 587 | 12N | 12N | Best Effort |

Again, queues 20 for storing multicast packets ingressing the ring at one of the network devices may be designated as a queue having the same ingress and egress. Unlike the above Table 1, however, in this example Table 2 includes a quality of service (QoS) class column, which in this instance provides for three QoS classes, e.g., Voice, Business, and Best Effort. The voice QoS class is representative of a streaming QoS class and generally reflects the class receiving the best treatment. The business QoS class is representative of a high speed QoS class that can withstand slight delays and generally reflects the class receiving the second best treatment. The best effort QoS class is representative of a QoS class that is not guaranteed to be delivered and generally reflects the class receiving the worst treatment. These QoS classes may also be applied to multicast traffic; for example, queue 0 may be used to buffer multicast Voice data traffic ingressing at network device 12A. Although only three classes are discussed herein, the principles of the invention contemplate any number (M) of QoS classes that distinguish classes based, not only on delay tolerance, but also on other criteria, such as bandwidth requirements.

After internally configuring its own set of queues 20, each of network devices 12 may receive packets from respective end-user devices 16 to be injected into ring network 10. Network devices 12 may also receive packets from other network devices 12 that have already entered ring network 10 at one or more other network devices 12. Each packet includes a source address and a destination address, where each address may comprise an L3 address (e.g., an internet protocol (IP) address) or an L2 address (e.g., MAC address). During forwarding of the packets on the network ring, each of network devices 12 may determine the ingress and egress network devices for each packet based on the address information within the packet and, based on that determination, select and store each packet to an appropriate one of queues 20. For example, such determination may be made by routing data and/or forwarding data maintained internally by each of the network devices 12. Network device 12A may parse the packet to determine these addresses and, using these addresses as a key, determine to which of queues 20 to store the received packet. In this way, the source and destination address information of a packet may be compared to the routing data so that the network device 12 forwarding the packet is able to determine the point along network ring 10 the packet was injected as well as the point at which the packet will be removed from the ring.

As another example, when injecting a packet into the network ring, the ingress network device 12 may add a tag, label or other identifier to the packet that uniquely identifies the ingress and egress device of the packet. For example, each of network devices 12 may store commonly agreed upon identifiers associated with each of the order-dependent pairs (ingress device, egress device), and such identifiers may be used by each of the network devices 12 at the time of forwarding packets to select an appropriate one of the internal queues. One example of such labels is Multi Protocol Label Switching (MPLS) labels, and distinct label switched paths (LSPs) may be assigned to each of the order-dependent pairs of network devices along network ring 10.

In instances where QoS classes are employed, network devices 12 may be further configured to tag each packet upon receipt from an end-user device 16 so as to further specify a QoS class for the tagged packet. For example, a packet conforming to a Voice over Internet Protocol (VoIP), such as a session initiation protocol (SIP), may be tagged to indicate a voice QoS class. When injecting packets into network ring 10, network devices 12 may analyze each packet to determine the QoS class to which the packet corresponds and, based on this determination, assign an appropriate identifier (or identifiers) to the packet to indicate the ingress and egress network device as well as the QoS class for the packet. As discussed above, network devices 12 may make use of MPLS labels, and network devices 12 may negotiate and establish distinct LSPs around network 10 for each combination of order-dependent (ingress, egress) pairs and QoS class.

For example, assuming network device 12B receives a transit packet from network device 12A, network device 12B may store the received packet to one of queues numbered 3, 4, or 5 within Table 2 based on the QoS tag and the source and destination addresses. Network device 12A may have initially received the packet from end-user device 16B, and may tag the packet to specify that the packet is associated with a voice QoS class and that the packet is associated with an LSP traversing network ring 10 from network device 12A to network device 12B. After tagging the packet (i.e., adding the appropriate MPLS label), network device 12A injects the packet onto network ring 10. Upon receiving the packet from network device 12A, network device 12B then parses the label stack of the packet to determine to which of queues 20 to store the packet. Considering that the tag (MPLS label in this example) indicates that the packet is associated with the voice QoS class, the packet was received via an LSP traversing the network ring from network device 12A to network device 12B, and using Table 2 as an example, network device 12B stores the packet to queue number 3 of its internal queue 20.

Each of network devices 12 forwards the various packets stored to queues 20 according to a scheduling algorithm, which is described below in more detail. Generally, network devices 12 implement the scheduling algorithm as a scheduling module (either in software or in hardware of a forwarding component), and the scheduling algorithm seeks to ensure that each of queues 20 receive an appropriate allocation of available bandwidth. The scheduling module may, for example, first schedule any packets stored to the voice QoS class queues, second schedule any packets stored to the business QoS class queues, and third schedule any packets stored to the best effort QoS class queues. For queues associated with the same QoS class, the scheduling algorithm may then seek to schedule packet forwarding fairly so as to overcome any preferential treatment to packets that originated at neighboring network devices. For example, the scheduling module of network device 12A may schedule packets originating from other network devices 12 that are remote from network device 12A prior to scheduling packets originating from network devices 12 that are proximate to hub network device 12A along the network ring 10. Because a queue 20 exists for each order-dependent pair, network devices 12 may implement sophisticated scheduling algorithms to account not only for the location of network devices 12 around ring network 10 but also for QoS classes for packet flows. Thus, by implementing the packet queuing techniques, network devices 12 may possibly reduce or even eliminate delays, as well as provide better assurance that QoS end user agreements will not be violated.

Figure 2:
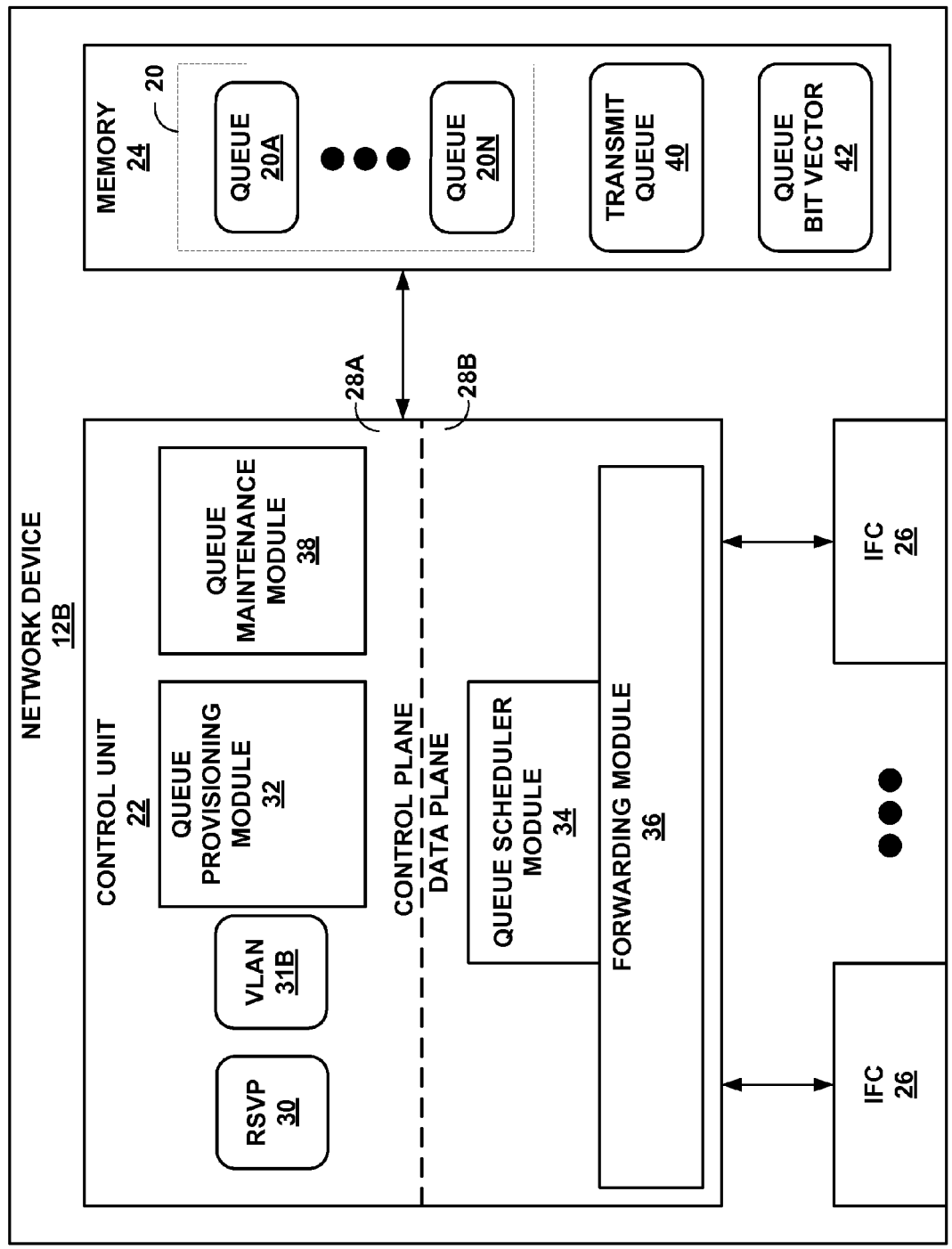
FIG. 2 is a block diagram illustrating an example embodiment of network device of FIG. 1 in more detail.

FIG. 2 is a block diagram illustrating an example embodiment of network device 12B of FIG. 1 in more detail. In this example, network device 12B comprises a control unit 22, a memory 24, and interface cards 26 ("IFCs 26"). Control unit 22 couples to both memory 24 and IFCs 26, where control unit 22 may couple to IFCs 26 via a switch fabric (not shown). Although described in reference to network device 12B, each of network devices 12 may include substantially similar components to those described below in reference to network device 12B.

As shown in FIG. 2, control unit 22 may be logically divided into two portions, a control plane portion 28A and a data plane portion 28B. Control plane 28A represents the hardware and software components that provide an operating environment for network protocols that are utilized to communicate with peer devices, e.g., other network devices 12, and provision queues 20. For example, control plane may include one or more microprocessors that execute an operating system on which the network protocols and other software execute. Data plane 28B represents the hardware and software components for handling data or packet forwarding. Data plane 28B may, for example, comprise a set of one or more dedicated ASICs for forwarding packets. Although shown as two portions 28A, 28B within a single control unit 22, the two portions may each comprise separate hardware and software to provide for the functionality attributed to these portions herein.

Control plane 28A includes a queue provisioning module 32 that is responsible for establishing queues 20 within memory 24. In this example, queue provisioning module includes resource reservation protocol module 30 ("RSVP 30") that executes the RSVP protocol to negotiate with peer network devices 12 so as to establish LSPs and reserve bandwidth for those LSPs. Queue provisioning module 32 may utilize RSVP 30 to determine information pertinent to configuring queues 20, such as the number of network devices 12 and QoS classes, as well as the amount of bandwidth to allocate to each of queues 20.

Data plane 28B includes queue scheduler module 34, forwarding module 36 and queue maintenance module 38. Queue scheduler module 34 represents a module that implements a scheduling algorithm, which, as described above, schedules currently stored packets for removal from queues 20 and forwarding over ring network 10. Forwarding module 36 represents a module responsible for forwarding the scheduled packets along the ring network. Packets may, from a forwarding perspective, traverse the ring in one of three ways: clockwise, counter-clockwise, and sideways. Clockwise traversal, as the name suggests, indicates that the packet traverses ring network 10 (FIG. 1) in a clockwise direction. Counter-clockwise traversal, again as the name suggests, indicates that the packet traverses ring network 10 in a counter-clockwise direction. Sideways traversal indicates that the packet received from the ring network 10 by a network device 12 exits the ring network at that given network device 12, thereby exiting or moving "sideways" from ring network 10. Forwarding module 36 and queue maintenance module 38 may be implemented in hardware as an ASIC or other component, firmware, or as software executable on a microcontroller or embedded processor within dataplane 28B.

Queue maintenance module 38 represents a module responsible for monitoring the status of each of queues 20. In particular, maintenance module 38 may determine whether each of queues 20 are nearing capacity and, in response, generate a flow control message to indicate that the ingress network device associated with that particular queue 20 needs to reduce or possibly stop traffic destined for network device 12B. Queue maintenance module 38 may regularly send these flow control messages, much like the hello messages described above. In some embodiments, queue maintenance module 40 may utilize these flow control messages in place of the above mentioned hello messages, as described in more detail below. Queue maintenance module 38 may be implemented in hardware as an ASIC or other component, firmware, or as software executable on a microcontroller or embedded processor within dataplane 28B.

Memory 24 may comprise any combination of static memory, e.g., a hard drive, read only memory (ROM), electrically erasable programmable ROM (EEROM), and flash memory, and/or dynamic memory, e.g., random access memory (RAM), static RAM (SRAM), dynamic RAM (DRAM), and a cache. Memory 24 stores a plurality of queues 20A-20N ("queues 20"), a transmit queue 40, and a queue bit vector 42. Transmit queue 40 represents a queue (or plurality of queues, such as in instances where each of IFCs 26 include one transmit queue) that stores packets scheduled to be forwarded over ring network 10 via IFCs 26. Queue bit vector 42 represents any data structure, not necessarily a queue, capable of representing the current state of each of queues 20. In one embodiment, queue bit vector 42 comprises a bit for each of queues 20, where each bit indicates whether the respective queue 20 is nearing capacity or is capable of storing additional packets.

Initially, upon being powered up or otherwise activated within ring network 10, network device 12B configures queues 20 within memory 24. In particular, queue provisioning module 32 determines the number of network devices 12 interspersed around ring network 10. Queue provisioning module 32 may be configured statically by a network administrator with the number of network devices and applicable QoS classes, and/or may automatically learn (i.e., discover) the number of network devices and applicable QoS classes dynamically from a provisioning system (not shown in FIG. 1) or via exchange of control-plane protocol messages, such as RSVP messages formulated in accordance with RSVP 30. Queue provisioning module 32 configures queues 20 by allocating distinct queue data structures within memory 24 based on the number of queues necessary to support the ring topology in accordance with the queuing techniques described herein.

Queue provisioning module 32 may also be statically configured and/or may dynamically learn how much of the available bandwidth to allocate to each of queues 20. Based on the bandwidth each queue is to receive, queue provisioning module 32 may adjust the size of the queue data structure, i.e., each of queues 20, to allocate an appropriate amount of bandwidth to each of queues 20. A larger queue data structure may be used to buffer packets for higher allocations of bandwidth by allowing that queue 20 to store more packets, which during times of congestion, may allow the associated queue 20 to store more packets before nearing capacity. A smaller relative queue data structure may be used for queues having allocations of less bandwidth by allowing that queue 20 to store less packets, which during times of congestion, may prohibit the associated queue 20 from storing packets, as the associated queue 20 may overrun its capacity more quickly.

Once queues 20 are configured, IFCs 26 of network device 12B may begin receiving packets from other network devices 12 or from end-user device 16A. The packets received by network device 12B may include some information identifying one or more of which of the three forwarding actions to perform and to which queues 20 to store the packet. The information may comprise one or more multiprotocol label switching (MPLS) protocol labels formed in accordance with a MPLS protocol. Alternatively or in conjunction with MPLS, the information may comprise one or more of a virtual local area network (VLAN) protocol identifier (ID). Control plane 28A therefore may include, as shown in FIG. 2, one or both of a RSVP protocol 30 (or a Label Distribution Protocol (LDP) module) for establishing MPLS LSPs and/or a VLAN protocol module ("VLAN 31B") for establishing VLANs.

When MPLS labels are employed for queue identification, queue scheduler module 34 may pop the MPLS label from the label stack and, based on this label, store the packet to the one of queues 20 associated with the LSP represented by the label. Thus, a mapping exists between the MPLS labels utilized for traversing the LSPs around ring network 10 and queues 20 internally maintained by network device 12B. In other words, each queue may be associated with a corresponding MPLS label value, and each label may be associated by network device 12B with a different ordered-pair of ingress/egress devices in combination with a particular QoS class. Queue provisioning module 32 may create and store this mapping and may install the mapping within queue scheduler module 34 to configure data plane 28B. As a result, when forwarding a packet, queue scheduler module 34 may look up the MPLS label carried by the packet within the stored MPLS->queue mapping and determine an identifier of or pointer to the appropriate one of queues 20 that is associated with the MPLS label of the packet.

Similarly, when VLAN IDs are employed for queue identification, queue scheduler module 34 may extract the VLAN ID and, based on this ID, store the packet to the queue 20 mapped to that particular VLAN ID for the VLAN that is established for the particular ordered-pair of ingress/egress devices in combination with a particular QoS class. Again, a mapping may exist between each VLAN ID and a corresponding one of queues 20, i.e., each queue may be associated with a corresponding VLAN ID. VLAN 31B executes the VLAN protocol in the control plane to establish the VLANs with other network devices 12 and installs the mapping within queue scheduler module 34 when configuring the data plane 28B. Queue scheduler module 34 may provide the packet having the VLAN ID to VLAN 31B, which may look up the VLAN ID label value within the mapping maintained by VLAN 31B and return to queue scheduler module 34 the number of the queue that is associated with the VLAN ID of the packet according to the mapping.

In addition to storing packet to queues 20, queue scheduler module 34 concurrently implements a scheduling algorithm that, in one embodiment, seeks to provide fairer treatment of packets by taking into considering the placement of network devices 12 around ring network 10 and possibly even QoS classes for different packet flows. A variety of scheduling algorithms may be employed. As one example, queue scheduler module 34 may first traverse each of queues 20 and move buffered packets from those queues 20 that are both associated with a highest QoS class and that are used for buffering packets from network devices 12 remote from network device 12B. Queue schedule module 34 moves those packets to a transmit queue 40 for direct output to the ring network 10. Queue scheduler module 34 continues to traverse queues 20 and move to transmit queue 40 any packets from queues corresponding to network devices 12 more proximate to a hub, e.g., network device 12A, and having a lower QoS class designations. In this example, queue scheduling module 34 traverses the queues 20 so as to prioritize packets based first the distance to the ingress network device and then, for packets ingressed by the same network device, based on quality of service. In this example, those packets bearing a "Best Effort" QoS class designation and from highly proximate network devices may be scheduled last. As another example, a different algorithm may be applied so as to prioritize packets based first on QoS class and then, for packets having the same QoS class, based on distance to the ingress network device that injected the packet. In addition, queue scheduler module 34 may implement a scheduling algorithm having a round-robin component so as to ensure that queue scheduler module 34 schedules at least one packet from each of queues 20 during a set period of time.

While queue scheduler module 34 schedules packets for forwarding, queue maintenance module 38 of control plane 28A monitors queues 20 to determine whether any of queues 20 are within a threshold of its particular capacity. For each of queues 20 that is near its capacity, queue maintenance module 38 updates an associated bit within queue bit vector 42 to indicate that the corresponding queue is near its capacity. Queue maintenance module 38 may, at regular intervals or upon a change in one of the bits of queue bit vector 42, generate a control message. The control message may include a copy of queue bit vector 42 or otherwise indicate the status of queues 20, e.g., by including only those bits of queue bit vector 42 that indicate an associated queue is near capacity. Queue maintenance module 38 forwards the control message around ring network 10, e.g., in the direction counter to that at which data plane packets are forwarded around the ring, as shown in FIG. 1. As successive network devices 12 receive the control message, those network devices 12 responsible for injecting the packets that have filled those queues indicated as near capacity within network device 12B may pause injecting such packets onto ring network 10 so as to allow the near capacity queues 20 to transmit stored packets and free up space within those near capacity queues 20. In order to use these control messages, each of network devices 12 may maintain a similar queue bit vector in which each bit corresponds to the same ordered-pair and such vector may be determined based on a mutually agreed-upon ranking of network devices 12 as well as agreed-upon ranking of QoS classes. In other words, the network devices 12 within ring network 10 employ a common queue labeling scheme so that the particular ordered-pair/QoS combination represented by each bit of the queue bit vector 12 is understood by each of the network devices.

As another example, an entire vector need not be sent and a control message may include one or more rank-ordered labels identifying only the particular queues at or near capacity.

Queue maintenance module 38 may, in some embodiments, send these control messages at regular intervals to keep network devices 12 apprised of the capacity of queues 20 of network device 12A. In these embodiments, network devices 12 may be configured to forgo using conventional hello messages and instead employ these control messages for the additional purpose of detecting failed links 14 in place of the conventional hello messages. Thus, queue maintenance module 38 may also maintain a maximum response time interval by which network device 12B should receive a control message from network device 12A. If queue maintenance module 38 does not receive a flow control message from network devices 12A within a time specified by maximum response time interval, queue maintenance module 38 determines that the respective link 14 between network devices 12A and network device 12B has failed. Queue maintenance module 38 may then formulate and forward a failed link message (or more generally, a control message) to inform all of the other network devices 12 that a link has failed. As described above, upon receiving the failed link message, network devices 12 may update its forwarding module 36 to account for the failed link.

Forwarding module 36, as described above, forwards to ring network 10 via IFCs 26 any packets stored within transmit queue 40 as well as and control messages produced by control plane 28A. RSVP 30 and VLAN 31B as well as any other network protocols executing within control plane 28A install forwarding information (e.g., in the form of a radix tree mapping next hops to output ports) within forwarding module 36 to configure data plane 28B and control packet forwarding. Forwarding component 36 utilizes the forwarding information in order to determine the appropriate direction, e.g., clockwise, counter-clockwise, or sideways, to forward a received packet. Based on headers within the packet, such as an MPLS label or VLAN id, forwarding module 36 forwards the packet to the appropriate IFC 26, which in turn outputs the packet via one of links 14 to another one of network devices 12 along ring network 10 or to one of end-user devices 16. In this manner, network device 12B performs the packet queuing techniques to possibly reduce packet forwarding delays due to the ring structure of network 10. Network device 12B may also avoid violation of QoS agreements with end-users by taking QoS classes into consideration when queuing and scheduling packets for forwarding.

The fair packet queuing techniques are described above with respect to a number of modules and components; however, these modules and components are presented merely for purposes of illustration. The modules may be implemented as separate functionalities of a single hardware component or of a single software program. Moreover, the modules may be implemented as a combination of both hardware and software. For example, a computer-readable storage medium may store instructions (e.g., software) that cause a programmable processor (e.g., hardware) to perform the fair packet queuing techniques described herein. In addition, different criteria and scheduling algorithms may be used. The techniques, therefore, should not be strictly limited to the particular exemplary embodiments described herein and may include a number of other embodiments.

Figure 3:
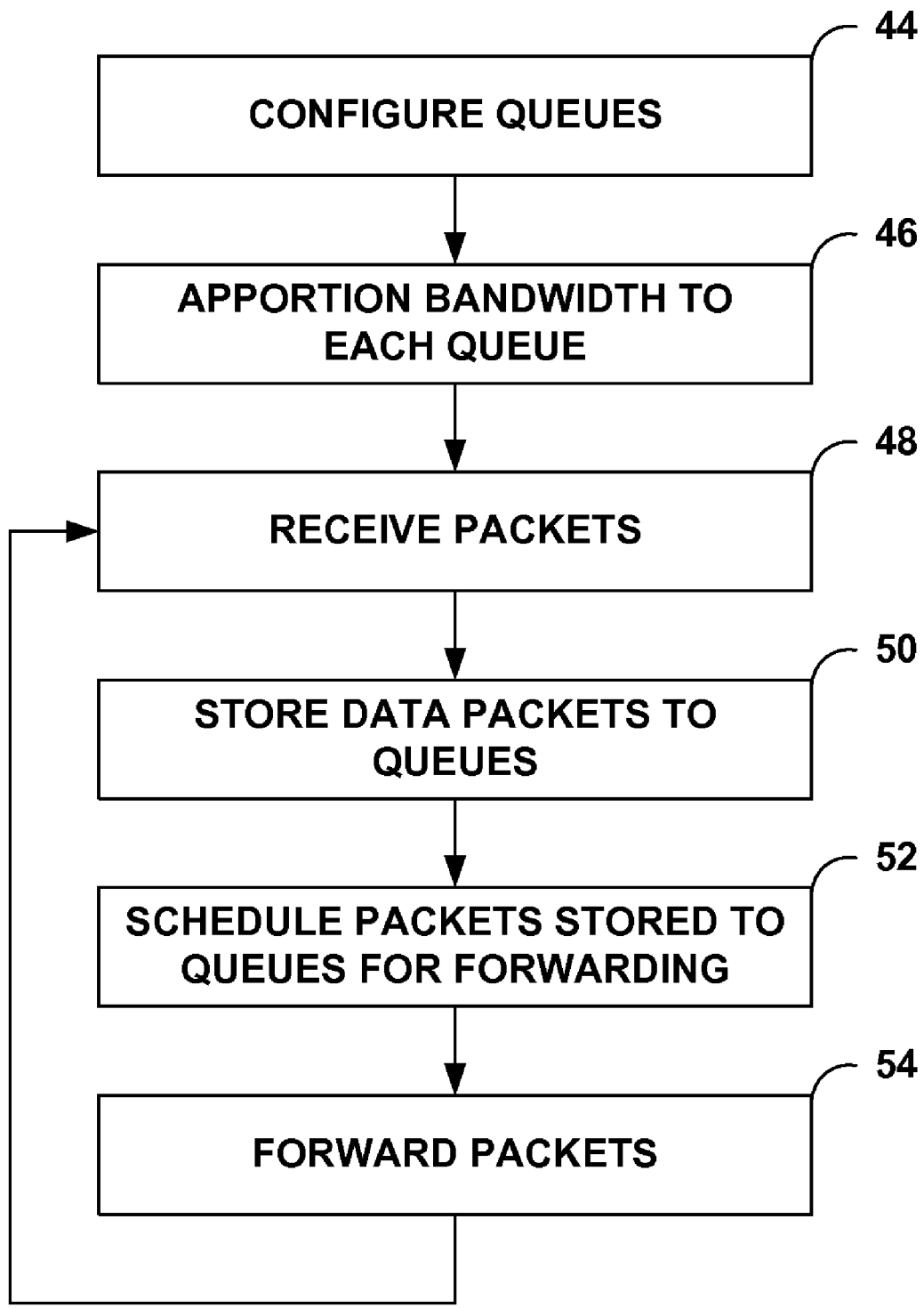
FIG. 3 is a flow chart illustrating exemplary operation of a network device in performing the packet queuing techniques described herein.

FIG. 3 is a flow chart illustrating exemplary operation of a network device, such as network device 12B of FIG. 2, in performing the packet queuing techniques described herein. Prior to forwarding packets around a ring network, such as ring network 10 of FIG. 1, network device 12B first configures queues 20 (44). As described above, queue provisioning module 32 of network device 12B configures a separate queue 20 for each order-dependent pair of network devices 12 and optionally for each combination of order-dependent pair and QoS class.

For example, queue provisioning module 32 may configure a first queue 20A to store packets that enter the ring network at network device 12A and will egress the ring at network device 12B, queue 20B to store packets that enter the ring network at network device 12A and egress at network device 12C, etc. Alternatively, queue provisioning module 32 may configure queue 20A to store packet having, for example, a voice QoS class designation that ingress at network device 12A and will egress at network device 12B, queue 20B to store packets having a business QoS class designation that ingress from network device 12A and will egress at network device 12C, etc. Queue provisioning module 32 may define a queue data structure and allocate to each queue data structure a portion of memory 24, which, as described above, may apportion bandwidth to each queue (46). That is, the allocated portion of memory 24 may indicate the portion of the available bandwidth each queue is to receive. Queue provisioning module 32 may be configured with the allocated portion of bandwidth each of queues 20 are to receive statically and/or learn this information dynamically, as described above.

After configuring queues 20, network device 12B receives packets via IFCs 26 (48). Queue scheduler module 34 stores these packets to queues 20 in the manner described above, e.g., based on information carried within a header of the packets (50). For example, queue scheduler module 34 may employ inspect each of the received packets to determine an MPLS label, a VLAN ID or other information so as to determine to which of queues 20 to store the received packets based on an MPLS label or VLAN identifier within a header of the packets. Alternatively, or in conjunction with MPLS labels or VLAN identifiers, queue scheduler module 34 may parse the packets to determine source and destination addresses, and based on these addresses, determine to which of queues 20 to store the received packets. In any event, queue scheduler module 34 stores the received packets to an appropriate one of queues 20 as described herein. In this manner, queue scheduler module directs received packets into the appropriate queues for further processing.

Concurrent with this operation, queue scheduler module 34 also schedules packets currently stored in queues 20 for forwarding via ring network 10 (52). Queue scheduler module 34 may implement a scheduling algorithm based on a variety of factors, as described above. While particular scheduling algorithms are described above, other scheduling algorithms may be used, such as any scheduling algorithm may be employed that accounts for the position of network devices 12 around ring network 10, e.g., with respect to a hub network device, in order to reduce delays associated with packet queuing in a ring network. Queue scheduler module 34 schedules packets for forwarding by moving the selected packets (or portions thereof, e.g., packet headers) from one of queues 20 to transmit queue 40 or by updating pointer references to the packets so as to mark the packets for forwarding without copying packet data.

Forwarding module 36 removes the packets from transmit queue 40, and applies forwarding information to key information within the packets in a high-speed manner to identify the forwarding direction of the packet, and forwards the packet to one of IFCs 26 (e.g., in accordance with stored forwarding information). IFCs 26, upon receiving the packet, forwards the packet via link 14 around ring network 10 (54). In this manner, a network device may possibly reduce delays by providing a separate queue for each order-dependent pair of network devices and possibly for each QoS class for each order-dependent pair of network devices. This higher-granularity queuing scheme, when compared to conventional queuing, enables more sophisticated and fine-grained scheduling algorithms that may take into account the position of the network devices around the ring and possibly the different QoS classes.

Figure 4:
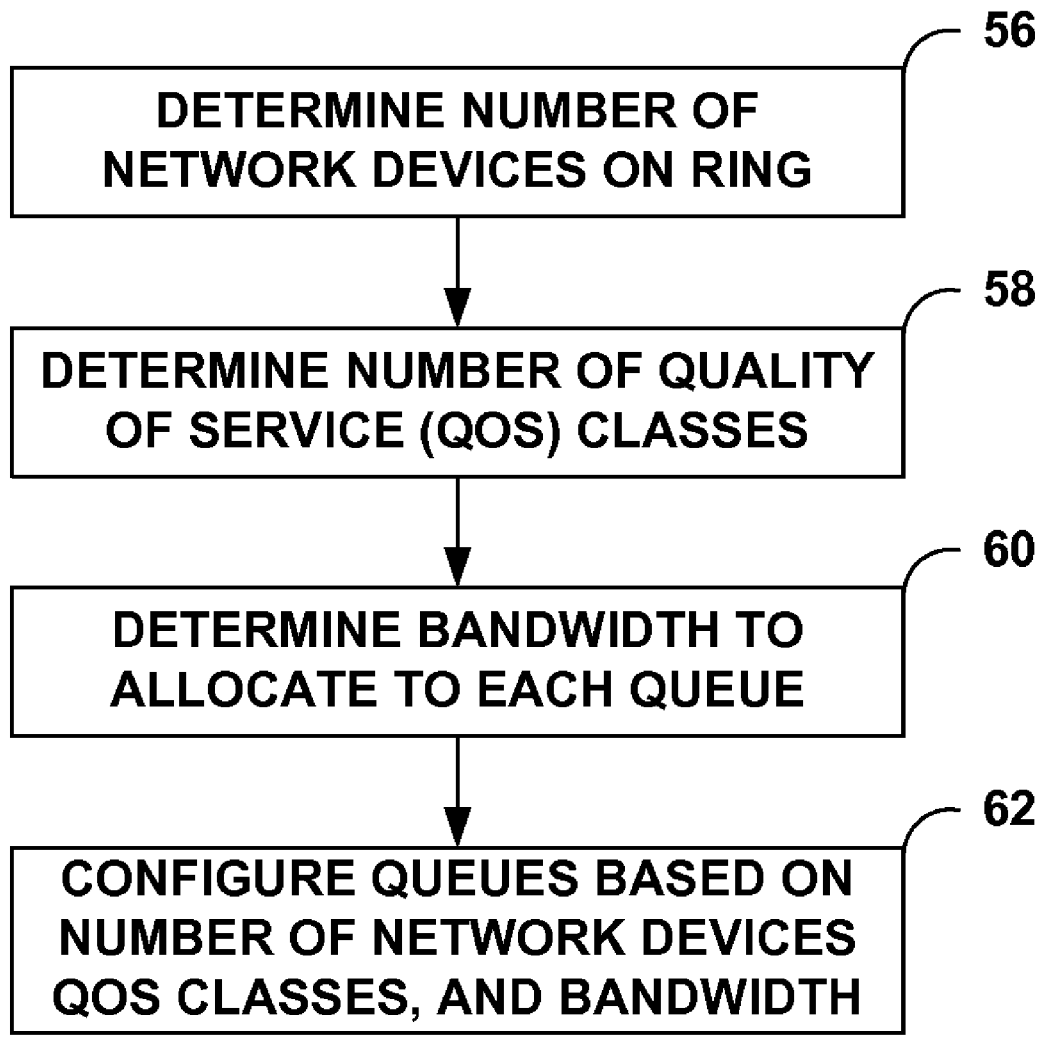
FIG. 4 is a flowchart illustrating exemplary operation of a network device in configuring queues in accordance with the fair packet queuing techniques described herein.

FIG. 4 is a flowchart illustrating exemplary operation of a network device, such as network device 12B of FIG. 2, in configuring queues, such as queues 20, in accordance with the fair packet queuing techniques described herein. In order to configure queues 20, queue provisioning module 32 of network device 12B initially determines the number of network devices (N) positioned around a ring network, such as ring network 10 (56).

Queue provisioning module 32 may determine the number of network devices 12 statically, dynamically, or a combination of both. That is, queue provisioning module 32 may be statically configured with the number of network devices by a network administrator via a command line interface or any other interface presented by network device 12 for receiving configuration commands. Alternatively or in conjunction with static configuration, queue provisioning module 32 may dynamically learn or determine the number of network devices via communications with a provisioning system. A provisioning system may comprise any system that stores network characteristics, such as QoS classes, the number of network devices, the addresses of network devices, the allocation of bandwidth to each network device or end-user device, or any other characteristic pertinent to forwarding packets around a ring network, such as ring network 10. Typically, the provisioning system is configured by an administrator with such network characteristics so that the network administrator need not configure each of network devices 12 individually and reconfigure devices 12 each time the network characteristics change.

Queue provisioning module 32 may also determine the number of quality of service (QoS) classes (M) offered by ring network 10 statically, dynamically, or a combination of both (58). As above, queue provisioning module 32 may be statically configured with the number of quality of service classes by a network administrator. Also similar to above, queue provisioning module 32 may dynamically learn or determine via communications with the provisioning system the number of QoS classes.

In order to configure queues 20, queue provisioning module 32 may also determine a portion of the available bandwidth that should be allocated to each of queues 20 (60). Again, queue provisioning module 32 may be statically configured with this bandwidth information or may dynamically learn this information from the provisioning system. Moreover, queue provisioning module 32 may employ a protocol, such as RSVP 30, to dynamically learn or determine the bandwidth allocation from other network devices 12.

Upon learning the number of network devices, the number of QoS classes, and the bandwidth allocations, queue provisioning module 32 configures queues 20 (62). In instances where no QoS classes are defined, queue provisioning module 32 may configure queues 20 such that one queue exists for each order-dependent pair of network devices 12 (i.e., ingress/egress pairs), as described above, for a total number of queues on the order of $N^2$ queues within each of the network devices. In instances, however, where a plurality of QoS classes exists, queue provisioning module 32 configures queues 20 such that one queue exists for each QoS class for each order-dependent pair of network devices 12, as described above, for a total number of queues on the order of $N^2 \times M$ queues within each of the network devices. In instances where multicast traffic is present, queue provisioning module 32 configures queues for multicast traffic entering the ring at each of network devices 12. Queue provisioning module 32 configures queues 20 by defining queue data structures within memory 24, whereby queue provisioning module 32 may allocate more memory to those queues having greater bandwidth allocation and less memory to those queues having less bandwidth allocation. In this manner, network device 12B configures queues 20 such that one queue exists for each order-dependent pair of network devices 12 distributed around ring network 10.

Figure 5:
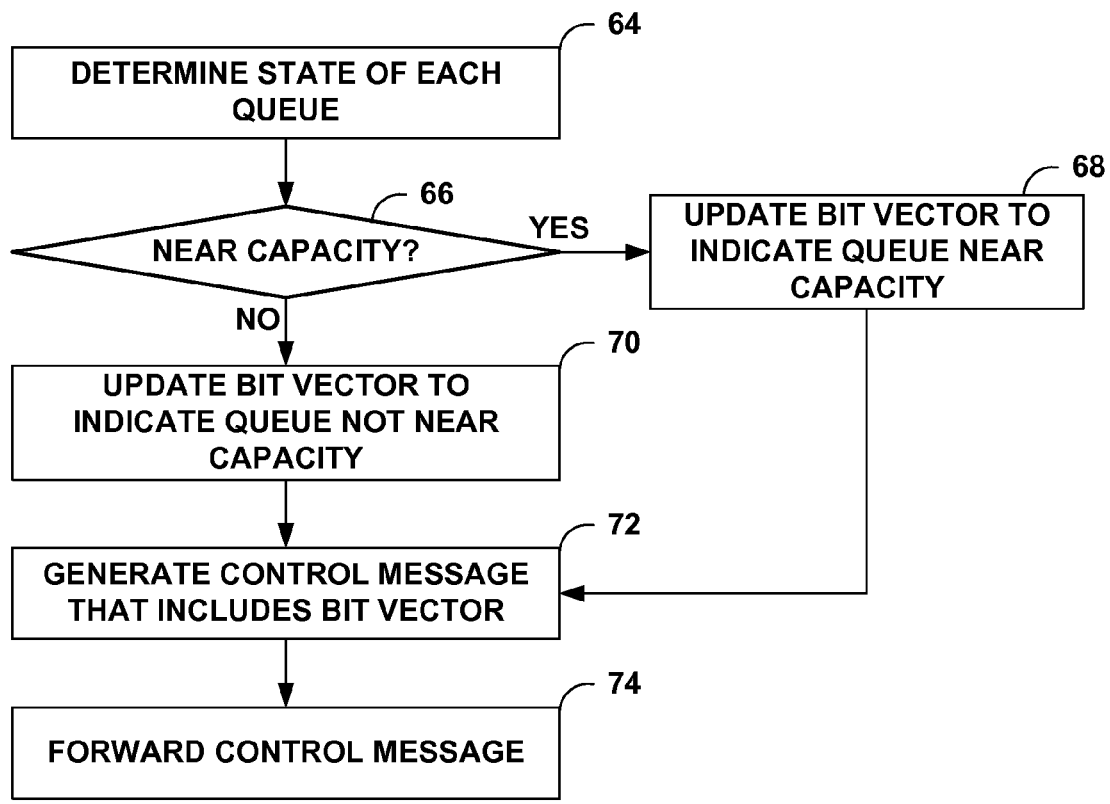
FIG. 5 is a flow chart illustrating exemplary operation of a network device in monitoring queues in accordance with the fair packet queuing techniques described herein.

FIG. 5 is a flowchart illustrating exemplary operation of a network device, such as network device 12B, in monitoring queues 20 in accordance with the fair packet queuing techniques described herein. As described above, queues 20 may be configured such that each of queues 20 are allocated an amount of memory reflective of each of queues 20 associated bandwidth. Therefore, to prevent bandwidth overruns, queue maintenance module 38 of network device 12B monitors each of queues 20 to ensure that bandwidth overruns do not occur. Queue maintenance module 38 further ensures that packets stored to near capacity queues 20 are not dropped, which may result in violations of QoS agreements with end users.

Queue maintenance module 38 monitors each of queues 20 by first determining the state of each of queues 20 (64). Queue maintenance module 38 may determine the state of each of queues 20 by determining whether each of queues 20 is near capacity (66). Near capacity queues 20 may be identified by measuring the current amount of memory occupied by packets stored to each of queues 20 against the total amount of memory allocated to each of queues 20. Queue maintenance module 38 may be configured by an administrator statically or may dynamically learn or determine capacity thresholds, e.g., ratios between occupied and total memory space, for each queue 20 that indicate when that particular queue is considered near capacity (e.g., 0.8 or 0.95). If the current capacity, e.g., ratio between the occupied and allocated memory space, exceeds or equals the established capacity level for that queue, queue maintenance module 38 sets a corresponding bit within queue bit vector 42 to indicate the associated one of queues 20 is nearing capacity (68).

Upon updating queue bit vector 42, queue maintenance module 38 generates a control message that includes queue bit vector 42, as described above (72). Next, queue maintenance module 38 forwards the control message by, for example, storing the control message to either one of queues 20 or transmit queue 40 (74). Queue maintenance module 38 may store the control message directly to transmit queue 40 as the control message may indicate critical capacity concerns that require immediate action.

However, upon determining that the queue is not near capacity (e.g., does not exceed the established capacity levels), queue maintenance module 38 updates queue bit vector 42 to indicate that the associated one of queues 20 is not near capacity (70). Queue maintenance module 38 may similarly generate a control message and forward the control message (72, 74), especially in the event such control messages are used by network devices 12 in place of keep alives or other periodic status messages. If not, queue maintenance module 38 may skip the operation of generating and forwarding a control message if none of the queues are near capacity.

In this manner, network devices within a ring network may apprise other network devices within the ring network of the capacity of queues 20 such that other network devices may adjust packet forwarding to account for near capacity queues by refraining from transmitting packets destined for those near capacity queues 20. This aspect of the fair packet queuing techniques enables network devices not only to adjust forwarding to prevent packets from being dropped but also may replace the above described hello messages, especially when these control messages are sent at frequent intervals, e.g., on the order of milliseconds. Various embodiments of the invention have been described. These and other embodiments are within the scope of the following claims.

The invention claimed is:

1. A method comprising:
   determining a number of packet forwarding network devices that provide ingress to or egress from to a packet-based, ring network;
   determining one or more quality of service (QoS) classes that each indicates a forwarding priority;
   within a first one of the network devices, allocating a queue for each order-dependent pair of the network devices in combination with each different one of the QoS classes so as to allocate at least $M*N*(N-1)$ queues in the first one of the network device, wherein M denotes the number of the determined one or more QoS classes and N denotes the number of packet forwarding network devices that form the ring topology and provide ingress to or egress from the network ring, wherein each of the pairs represents a different order-dependent combination of the network devices that includes one of the network devices that provides an ingress for packets to the ring network and one of the network devices that provides an egress from the ring network for the packets;
   receiving, with the first one of the network devices, a packet forwarded by a neighboring one of the other plurality of network devices along the ring network;
   selecting one of the order-dependent pairs of the network devices based on the one of the network devices that provided the ingress for the packet to the ring network and the one of the network devices that will provide the egress for the packet from the ring network;
   selecting one of the plurality of queues within the first one of the network devices based on the selected order-dependent pair of network devices;
   storing the packet to the selected queue within the first one of the network devices; and
   forwarding the packet via the ring network.

2. The method of claim 1,
   wherein the packet includes a source address of a computing device that originated the packet and a destination address for a computing device to which the packet is destined, and
   wherein selecting one of the order-dependent pairs of the network devices comprises:
      determining the one of the network devices along the ring network that provided the ingress for the packet and the one of the network devices along the ring that will provide the egress for the packet from the ring network based on the source address and the destination address; and
      selecting the one of the order-dependent pairs that matches the determined network device that provided the ingress for the packet and the network device that will provide the egress for the packet.

3. The method of claim 2, wherein the source address and the destination address are layer two addresses or layer three addresses.

4. The method of claim 1,
   wherein the packet includes layer two (L2) information containing an identifier for a virtual local area network (VLAN), and
   wherein selecting one of the order-dependent pairs of the network devices comprises selecting the one of the order-dependent pairs of network devices based on the VLAN identifier.

5. The method of claim 4, further comprising storing data within each of the network devices that defines a plurality of VLANs through the ring network and maps a different one of the VLANs to each of the ordered-pair combinations of ingress and egress network devices.

6. The method of claim 1,
   wherein the packet includes a stack of one or more Multi Protocol Label Switching (MPLS) labels, and
   wherein selecting one of the order-dependent pairs of the network devices comprises selecting the one of the order-dependent pairs based on at least one of the MPLS labels carried by the packet.

7. The method of claim 6, further comprising storing data within each of the network devices that defines a plurality of label switched paths through the ring network and maps a different one of the label switched path to each of the ordered-pair combinations of ingress and egress network devices.

8. The method of claim 1, wherein forwarding packets comprises forwarding packets stored in the plurality of queues via the ring network according to a scheduling algorithm that schedules packets to be forwarded from the queues based on at least a position of each of the plurality of network devices around the ring network.

9. The method of claim 1, wherein allocating a queue for each order-dependent pair of network devices comprises allocating at least $N*(N-1)$ queues in the first one of the network device, wherein N is the number of packet forwarding network devices that form the ring topology and provide ingress to or egress from the network ring.

10. The method of claim 1, wherein allocating a queue for each order-dependent pair of network devices comprises allocating at least $N^2$ queues in the first one of the network device, wherein N is the number of packet forwarding network devices that form the ring topology and provide ingress to or egress from the network ring.

11. The method of claim 1, wherein allocating the plurality of queues comprises:
   allocating at least $M*N^2$ queues in the first one of the network device, wherein M is the number of QoS classes, N is the number of packet forwarding network devices that form the ring topology and provide ingress to or egress from the network ring.

12. The method of claim 1,
   wherein the packet includes a header or tag indicating one of the QoS classes, and
   wherein selecting one of the queues comprises selecting the one of the plurality of queues based at least in part on the QoS class indicated by the header or tag.

13. The method of claim 1, allocating a queue for at least each order-dependent pair of the network devices comprises designating those queues associated with order-dependent pairs for which the ingress network device is the same as the egress network device as storing multicast packets from the ingress network device.

14. The method of claim 1,
wherein allocating the plurality of queues further comprises allocating, in addition to the order-dependent queues, a multicast queue for each of the network devices, wherein each multicast queues comprises a queue that stores multicast traffic ingressing the ring at each of the respective one of the network devices,
wherein receiving the packet comprises receiving a multicast packet forwarded by the neighboring one of the other plurality of network devices along the ring network, and
the method further comprising:
selecting one of the network devices that provided the ingress for the multicast packet to the ring network;
selecting one of the plurality of multicast queues within the first one of the network devices based on the selected one of network devices that provided the ingress for the multicast packet; and
storing the packet to the selected multicast queue within the first one of the network devices,
wherein forwarding the packet via the ring network comprises forwarding the multicast packet via the ring network.

15. The method of claim 14, wherein allocating the plurality of multicast queues comprises:
allocating at least M*N multicast queues in the first one of the network device, wherein M is the number of QoS classes, and N is the number of packet forwarding network devices that form the ring topology and provide ingress to the network ring.

16. The method of claim 1, further comprising:
monitoring, with the network device, the queues to determine whether one or more of the queues is nearing capacity;
based on the determination, updating a queue bit vector stored within the network device to indicate that one or more of the queues is nearing capacity; and
forwarding a control message to each of the other plurality of network devices to indicate that one or more of the queues are nearing capacity, wherein the control message includes at least a portion of the queue bit vector.

17. The method of claim 1, further comprising:
receiving from one of the plurality of network devices a control message that includes a queue bit vector, wherein the queue bit vector indicates that one or more of a plurality of queues of the one of the plurality of network devices is nearing capacity;
in response to receiving the control message, determining whether the queue bit vector indicates that one of the queues for storing packets originating from the network device is nearing capacity; and
based on the determination, halting the forwarding of the packet, with the network device, to the one of the plurality of network devices that forwarded the control message so as to enable the one of the plurality of network devices that forwarded the control message to at least reduce a number of the packets stored to those queues identified as near capacity.

18. The method of claim 1,
wherein the network devices include layer two switches, and
wherein the ring network comprises an optical fiber ring network.

19. The method of claim 1,
wherein the network devices include layer three (L3) routers, and
wherein the ring network comprises an optical fiber ring network.

20. A network device of a plurality of network devices that form a ring network, the network device comprising:
a memory having a different queue for each order-dependent pair of the network devices, wherein each of the pairs represents a different order-dependent combination of the network devices that includes one of the network devices that provides an ingress for packets to the ring network and one of the network devices that provides an egress from the ring network for the packets;
an interface for receiving a packet from a neighboring one of the plurality of network devices; and
a control unit that, in response to receiving the packet, stores the packet to one of the queues based on the one of the network devices that provided the ingress for the packet to the ring network and the one of the network devices that will provide the egress for the packet from the ring network, and forwards the stored packet via the ring network according to a scheduling algorithm,
wherein the control unit includes a queue provisioning module that determines one or more quality of service (QoS) classes that each indicates a forwarding priority and allocates, within the network device, the queues for each of the different order-dependent pairs of the network devices in combination with each different one of the QoS classes such that the queue provisioning module allocates at least $M*N*(N-1)$ queues in the first one of the network device, wherein M denotes the number of the determined one or more QoS classes and N denotes the number of the plurality of network devices that form the ring topology and provide ingress to or egress from the network ring.

21. The network device of claim 20,
wherein the packet includes a source address of a computing device that originated the packet and a destination address for a computing device to which the packet is destined, and
wherein the control unit further includes a queue scheduling module that:
determines the one of the network devices along the ring network that provided the ingress for the packet and the one of the network devices along the ring that will provide the egress for the packet from the ring network based on the source address and the destination address; and
selects the one of the order-dependent pairs that matches the determined network device that provided the ingress for the packet and the network device that will provide the egress for the packet.

22. The network device of claim 21, wherein the source address and the destination address are layer two addresses or layer three addresses.

23. The network device of claim 20,
wherein the packet includes layer two (L2) information containing an identifier for a virtual local area network (VLAN), and
wherein the control unit includes a queue scheduling module that selects the one of the order-dependent pairs of network devices based on the VLAN identifier.

24. The network device of claim 23, wherein the memory further stores data that defines a plurality of VLANS through the ring network and maps a different one of the VLANS to each of the ordered-pair combinations of ingress and egress network devices.

25. The network device of claim 20,
wherein the packet includes a stack of one or more Multi Protocol Label Switching (MPLS) labels, and
wherein the control unit includes a queue scheduling module that selects the one of the order-dependent pairs based on at least one of the MPLS labels carried by the packet.

26. The network device of claim 25, wherein the memory further stores data that defines a plurality of label switched paths through the ring network and maps a different one of the label switched path to each of the ordered-pair combinations of ingress and egress network devices.

27. The network device of claim 20, wherein the control unit includes a forwarding module that forwards the packets stored in the plurality of queues via the ring network according to a scheduling algorithm that schedules packets to be forwarded from the queues based on at least a position of each of the plurality of network devices around the ring network.

28. The network device of claim 1, wherein the control unit includes a queue provisioning module that allocates at least $N*(N-1)$ queues in the first one of the network device, wherein N is the number of the plurality of network devices that form the ring topology and provide ingress to or egress from the network ring.

29. The network device of claim 1, wherein the control unit includes a queue provisioning module that allocates at least $N^2$ queues in the first one of the network device, wherein N is the number of the plurality of network devices that form the ring topology and provide ingress to or egress from the network ring.

30. The network device of claim 20, wherein the queue provisioning module further allocates at least $M*N^2$ queues in the first one of the network device, wherein M is the number of QoS classes, N is the number of the plurality of network devices that form the ring topology and provide ingress to or egress from the network ring.

31. The network device of claim 20,
wherein the packet includes a header or tag indicating one of the QoS classes, and
wherein the control unit includes a queue scheduler module that selects the one of the plurality of queues based at least in part on the QoS class indicated by the header or tag.

32. The network device of claim 20, wherein the control unit includes a queue provisioning module that allocates, in addition to the order-dependent queues, a multicast queue for each of the network devices, wherein each multicast queues comprises a queue that stores multicast traffic ingressing the ring at each of the respective one of the network devices,
wherein the interface further receives a multicast packet forwarded by the neighboring one of the other plurality of network devices along the ring network, and
wherein the control unit further selects one of the network devices that provided the ingress for the multicast packet to the ring network, selects one of the plurality of multicast queues within the first one of the network devices based on the selected one of network devices that provided the ingress for the multicast packet, and stores the packet to the selected multicast queue within the first one of the network devices, the control unit further forwarding the multicast packet via the ring network.

33. The network device of claim 32, wherein the queue provisioning module allocates at least M*N multicast queues in the first one of the network device, wherein M is the number of QoS classes, and N is the number of the plurality of network devices that form the ring topology and provide ingress to the network ring.

34. The network device of claim 20, wherein the control unit includes a queue provisioning module that designates those queues associated with order-dependent pairs for which the ingress network device is the same as the egress network device as storing multicast packets from the ingress network device.

35. The network device of claim 20,
wherein the control unit includes a queue maintenance module that monitors the queues to determine whether one or more of the queues is nearing capacity, based on the determination, updates a queue bit vector stored within the network device to indicate that one or more of the queues is nearing capacity, and forms a control message to each of the other plurality of network devices to indicate that one or more of the queues are nearing capacity, wherein the control message includes at least a portion of the queue bit vector, and
wherein the interface forwards the control message.

36. The network device of claim 20,
wherein the interface further receives from one of the plurality of network devices a control message that includes a queue bit vector, wherein the queue bit vector indicates that one or more of a plurality of queues of the one of the plurality of network devices is nearing capacity, and
wherein the control unit includes a queue maintenance module that:
in response to receiving the control message, determines whether the queue bit vector indicates that one of the queues for storing packets originating from the network device is nearing capacity; and
based on the determination, halts the forwarding of the packet, with the network device, to the one of the plurality of network devices that forwarded the control message so as to enable the one of the plurality of network devices that forwarded the control message to at least reduce a number of the packets stored to those queues identified as near capacity.

37. The network device of claim 20,
wherein the network devices include layer two switches, and
wherein the ring network comprises an optical fiber ring network.

38. The network device of claim 20,
wherein the network devices include layer three (L3) routers, and
wherein the ring network comprises an optical fiber ring network.

39. A system that forms a ring network, the system comprising:
a plurality of network devices, wherein each of the plurality of network devices comprises:
a memory having a different queue for each order-dependent pair of the network devices, wherein each of the pairs represents a different order-dependent combination of the network devices that includes one of the network devices that provides an ingress for packets to the ring network and one of the network devices that provides an egress from the ring network for the packets;
an interface for receiving a packet from a neighboring one of the plurality of network devices; and
a control unit that, in response to receiving the packet, stores the packet to one of the queues based on the one of the network devices that provided the ingress for the packet to the ring network and the one of the network devices that will provide the egress for the packet from the ring network, and forwards the stored packet via the ring network according to a scheduling algorithm, wherein the control unit includes a queue provisioning module that determines one or more quality of service (QoS) classes that each indicates a forwarding priority and allocates, within the network device, the queues for each of the different order-dependent pairs of the network devices in combination with each different one of the QoS classes such that the queue provisioning module allocates at least M*N*(N−1) queues in the first one of the network device, wherein M denotes the number of the determined one or more QoS classes and N denotes the number of the plurality of network devices that form the ring topology and provide ingress to or egress from the network ring.

40. The system of claim 39,
wherein the packet includes a source address of a computing device that originated the packet and a destination address for a computing device to which the packet is destined, and
wherein each of the control units further includes a queue scheduling module that:
  determines the one of the network devices along the ring network that provided the ingress for the packet and the one of the network devices along the ring that will provide the egress for the packet from the ring network based on the source address and the destination address; and
  selects the one of the order-dependent pairs that matches the determined network device that provided the ingress for the packet and the network device that will provide the egress for the packet.

41. The system of claim 40, wherein the source address and the destination address are layer two addresses or layer three addresses.

42. The system of claim 39,
wherein the packet includes layer two (L2) information containing an identifier for a virtual local area network (VLAN), and
wherein each of the control units includes a queue scheduling module that selects the one of the order-dependent pairs of network devices based on the VLAN identifier.

43. The network device of claim 42, wherein each of the memories further stores data that defines a plurality of VLANS through the ring network and maps a different one of the VLANS to each of the ordered-pair combinations of ingress and egress network devices.

44. The system of claim 39,
wherein the packet includes a stack of one or more Multi Protocol Label Switching (MPLS) labels, and
wherein each of the control units includes a queue scheduling module that selects the one of the order-dependent pairs based on at least one of the MPLS labels carried by the packet.

45. The system of claim 44, wherein each of the memories further stores data that defines a plurality of label switched paths through the ring network and maps a different one of the label switched path to each of the ordered-pair combinations of ingress and egress network devices.

46. The system of claim 39, wherein each of the control units includes a forwarding module that forwards the packets stored in the plurality of queues via the ring network according to a scheduling algorithm that schedules packets to be forwarded from the queues based on at least a position of each of the plurality of network devices around the ring network.

47. The system of claim 39, wherein each of the control unit includes a queue provisioning module that allocates at least N*(N−1) queues in the first one of the network device, wherein N is the number of the plurality of network devices that form the ring topology and provide ingress to or egress from the network ring.

48. The system of claim 39, wherein each of the control unit includes a queue provisioning module that allocates at least $N^2$ queues in the first one of the network device, wherein N is the number of the plurality of network devices that form the ring topology and provide ingress to or egress from the network ring.

49. The system of claim 39, wherein the queue provisioning module of each of the control units further allocates the plurality of queues by allocating at least $M*N^2$ queues in the first one of the network device, wherein M is the number of QoS classes, N is the number of the plurality of network devices that form the ring topology and provide ingress to or egress from the network ring.

50. The system of claim 39,
wherein the packet includes a header or tag indicating one of the QoS classes, and
wherein each of the control units includes a queue scheduler module that selects one of the queues by selecting the one of the plurality of queues based at least in part on the QoS class indicated by the header or tag.

51. The system of claim 39, wherein each of the control units includes a queue provisioning module that allocates a queue for at least each order-dependent pair of the network devices by designating those queues associated with order-dependent pairs for which the ingress network device is the same as the egress network device as storing multicast packets from the ingress network device.

52. The system of claim 39,
wherein each of the control units includes a queue maintenance module that:
monitors the queues to determine whether one or more of the queues is nearing capacity;
based on the determination, updates a queue bit vector stored within the network device to indicate that one or more of the queues is nearing capacity; and
forms a control message to each of the other plurality of network devices to indicate that one or more of the queues are nearing capacity, wherein the control message includes at least a portion of the queue bit vector, and
wherein each of the interface forwards the control message.

53. The system of claim 39,
wherein each of the interfaces further receives from one of the plurality of network devices a control message that includes a queue bit vector, wherein the queue bit vector indicates that one or more of a plurality of queues of the one of the plurality of network devices is nearing capacity, and
wherein each of the control units includes a queue maintenance module that:
in response to receiving the control message, determines whether the queue bit vector indicates that one of the queues for storing packets originating from the network device is nearing capacity; and
based on the determination, halts the forwarding of the packet, with the network device, to the one of the plurality of network devices that forwarded the control message so as to enable the one of the plurality of network devices that forwarded the control message to at least reduce a number of the packets stored to those queues identified as near capacity.

54. The system of claim 39,
wherein the network devices include layer two switches, and
wherein the ring network comprises an optical fiber ring network.

55. The system of claim 39,
wherein the network devices include layer three (L3) routers, and
wherein the ring network comprises an optical fiber ring network.

56. The network system of claim 39, wherein the control unit includes a queue provisioning module that allocates, in addition to the order-dependent queues, a multicast queue for each of the network devices, wherein each multicast queues comprises a queue that stores multicast traffic ingressing the ring at each of the respective one of the network devices,
wherein the interface further receives a multicast packet forwarded by the neighboring one of the other plurality of network devices along the ring network, and
wherein the control unit further selects one of the network devices that provided the ingress for the multicast packet to the ring network, selects one of the plurality of multicast queues within the first one of the network devices based on the selected one of network devices that provided the ingress for the multicast packet, and stores the packet to the selected multicast queue within the first one of the network devices, the control unit further forwarding the multicast packet via the ring network.

57. The network system of claim 56, wherein the queue provisioning module allocates at least M*N multicast queues in the first one of the network device, wherein M is the number of QoS classes, and N is the number of the plurality of network devices that form the ring topology and provide ingress to the network ring.

58. A non-transitory computer-readable medium comprising instructions for causing a programmable processor to:
determine a number of packet forwarding network devices that provide ingress to or egress from to a packet-based, ring network;
determining one or more quality of service (QoS) classes that each indicates a forwarding priority;
within a first one of the network devices, allocating a queue for each order-dependent pair of the network devices in combination with each different one of the QoS classes so as to allocate at least M*N*(N−1) queues in the first one of the network device, wherein M denotes the number of the determined one or more QoS classes and N denotes the number of packet forwarding network devices that form the ring topology and provide ingress to or egress from the network ring, wherein each of the pairs represents a different order-dependent combination of the network devices that includes one of the network devices that provides an ingress for packets to the ring network and one of the network devices that provides an egress from the ring network for the packets;
receive, with the first one of the network devices, a packet forwarded by a neighboring one of the other plurality of network devices along the ring network;
select one of the order-dependent pairs of the network devices based on the one of the network devices that provided the ingress for the packet to the ring network and the one of the network devices that will provide the egress for the packet from the ring network;
select one of the plurality of queues within the first one of the network devices based on the selected order-dependent pair of network devices;
store the packet to the selected queue within the first one of the network devices; and
forward the packet via the ring network.

* * * * *